(12) United States Patent
McDonald et al.

(10) Patent No.: US 7,204,940 B2
(45) Date of Patent: Apr. 17, 2007

(54) CONDUCTIVE POLYMER-BASED MATERIAL

(75) Inventors: William F. McDonald, Utica, OH (US); Amy B. Koren, Lansing, MI (US); Sunil K. Dourado, Ann Arbor, MI (US); Joel I. Dulebohn, Lansing, MI (US); Robert J. Hanchar, Charlotte, MI (US)

(73) Assignee: Michigan Biotechnology Institute, Lansing, MI (US)

( * ) Notice: Subject to any disclaimer, the term of this patent is extended or adjusted under 35 U.S.C. 154(b) by 299 days.

(21) Appl. No.: 10/392,347

(22) Filed: Mar. 19, 2003

(65) Prior Publication Data

US 2004/0051083 A1 Mar. 18, 2004

Related U.S. Application Data

(60) Provisional application No. 60/366,100, filed on Mar. 20, 2002.

(51) Int. Cl.
*H01B 1/22* (2006.01)

(52) U.S. Cl. ............... 252/512; 252/514; 528/420

(58) Field of Classification Search ............. 252/512, 252/513, 514; 528/420; 524/439, 440
See application file for complete search history.

(56) References Cited

U.S. PATENT DOCUMENTS

| | | | |
|---|---|---|---|
| 2,274,831 A | 3/1942 | Hill | |
| 2,691,643 A | 10/1954 | Chirtel et al. | |
| 2,786,045 A | 3/1957 | Chirtel et al. | |
| 2,968,629 A | 1/1961 | Thompson | |
| 3,525,718 A | 8/1970 | Derieg et al. | |
| 3,695,921 A | 10/1972 | Shepherd et al. | |
| 3,729,516 A | 4/1973 | Stockel et al. | |
| 4,054,139 A | 10/1977 | Crossley | |
| 4,092,443 A | 5/1978 | Green | |

(Continued)

FOREIGN PATENT DOCUMENTS

EP 0 882 461 12/1998

(Continued)

OTHER PUBLICATIONS

Satoh et al., "Immobilization of Saccharides and Peptides on 96-Well Microtiter Plates with Methyl Vinyl ether-Maleic Anhydride Copolymer", Analyt. Biochem., 260, 96-102, 1998.

(Continued)

*Primary Examiner*—Mark Kopec
(74) *Attorney, Agent, or Firm*—Dickinson Wright PLLC

(57) ABSTRACT

Disclosed are polymer-based coatings and materials comprising (i) a polymeric composition including a polymer having side chains along a backbone forming the polymer, at least two of the side chains being substituted with a heteroatom selected from oxygen, nitrogen, sulfur, and phosphorus and combinations thereof; and (ii) a plurality of metal species distributed within the polymer. At least a portion of the heteroatoms may form part of a chelation complex with some or all of the metal species. In many embodiments, the metal species are present in a sufficient concentration to provide a conductive material, e.g., as a conductive coating on a substrate. The conductive materials may be useful as the thin film conducting or semi-conducting layers in organic electronic devices such as organic electroluminescent devices and organic thin film transistors.

34 Claims, 2 Drawing Sheets

U.S. PATENT DOCUMENTS

| | | |
|---|---|---|
| 4,128,633 A | 12/1978 | Lorenz et al. |
| 4,217,338 A | 8/1980 | Quash |
| 4,302,368 A | 11/1981 | Dudley et al. |
| 4,310,509 A | 1/1982 | Berglund et al. |
| 4,323,557 A | 4/1982 | Rosso et al. |
| 4,326,532 A | 4/1982 | Hammar |
| 4,357,476 A | 11/1982 | Reinchr et al. |
| 4,419,444 A | 12/1983 | Quash |
| 4,442,133 A | 4/1984 | Greco et al. |
| 4,459,132 A | 7/1984 | Kaufman et al. |
| 4,581,028 A | 4/1986 | Fox, Jr. et al. |
| 4,603,152 A | 7/1986 | Laurin et al. |
| 4,605,564 A | 8/1986 | Kulla et al. |
| 4,642,104 A | 2/1987 | Sakamoto et al. |
| 4,675,347 A | 6/1987 | Mochizuki et al. |
| 4,678,660 A | 7/1987 | McGary et al. |
| 4,720,512 A | 1/1988 | Hu et al. |
| 4,786,556 A | 11/1988 | Hu et al. |
| 4,810,784 A | 3/1989 | Larm |
| 4,865,870 A | 9/1989 | Hu et al. |
| 4,874,813 A | 10/1989 | O'Shannessy |
| 4,889,596 A | 12/1989 | Schoggen et al. |
| 4,933,178 A | 6/1990 | Capelli |
| 4,948,836 A | 8/1990 | Solomon et al. |
| 4,954,526 A | 9/1990 | Keefer |
| 4,987,181 A | 1/1991 | Bichon et al. |
| 4,999,210 A | 3/1991 | Solomon et al. |
| 5,019,096 A | 5/1991 | Fox, Jr. et al. |
| 5,019,102 A | 5/1991 | Hoene |
| 5,039,705 A | 8/1991 | Keefer et al. |
| 5,049,684 A | 9/1991 | Tomibe et al. |
| 5,069,907 A | 12/1991 | Mixon et al. |
| 5,104,931 A | 4/1992 | Fleminger et al. |
| 5,155,137 A | 10/1992 | Keefer et al. |
| 5,185,376 A | 2/1993 | Diodati et al. |
| 5,292,939 A | 3/1994 | Hollingsworth |
| 5,316,912 A | 5/1994 | Heimgartner et al. |
| 5,317,169 A | 5/1994 | Nakano et al. |
| 5,319,110 A | 6/1994 | Hollingsworth |
| 5,328,698 A | 7/1994 | Onwumere et al. |
| 5,344,411 A | 9/1994 | Domb et al. |
| 5,374,773 A | 12/1994 | Hollingsworth |
| 5,405,919 A | 4/1995 | Keefer et al. |
| 5,482,925 A | 1/1996 | Hutsell |
| 5,543,079 A | 8/1996 | Ohnishi et al. |
| 5,641,855 A | 6/1997 | Scherr et al. |
| 5,650,447 A | 7/1997 | Keefer et al. |
| 5,691,423 A | 11/1997 | Smith et al. |
| 5,707,366 A | 1/1998 | Solomon et al. |
| 5,709,672 A | 1/1998 | Illner |
| 5,762,638 A | 6/1998 | Shikanl et al. |
| 5,766,515 A | 6/1998 | Jonas et al. |
| 5,814,656 A | 9/1998 | Saavedra et al. |
| 5,962,520 A | 10/1999 | Smith et al. |
| 5,994,444 A | 11/1999 | Trescony et al. |
| 6,030,632 A | 2/2000 | Sawan et al. |
| 6,042,877 A | 3/2000 | Lyon et al. |
| 6,056,967 A | 5/2000 | Steuerle et al. |
| 6,083,635 A | 7/2000 | Jonas et al. |
| 6,087,462 A | 7/2000 | Bowers et al. |
| 6,099,897 A * | 8/2000 | Sayo et al. .................. 427/180 |
| 6,107,117 A | 8/2000 | Bao et al. |
| 6,121,027 A | 9/2000 | Clapper et al. |
| 6,153,724 A | 11/2000 | Hollingsworth |
| 6,162,487 A | 12/2000 | Darouiche |
| 6,200,558 B1 | 3/2001 | Saavedra et al. |
| 6,207,301 B1 | 3/2001 | Ohnishi et al. |
| 6,224,579 B1 | 5/2001 | Modak et al. |
| 6,232,336 B1 | 5/2001 | Hrabie et al. |
| 6,232,434 B1 | 5/2001 | Stamler et al. |
| 6,270,779 B1 | 8/2001 | Fitzhugh et al. |
| 6,319,674 B1 | 11/2001 | Fulcrand et al. |
| 6,340,465 B1 | 1/2002 | Hsu et al. |
| 6,399,714 B1 | 6/2002 | Huang et al. |
| 6,495,657 B1 | 12/2002 | McDonald et al. |
| 6,509,104 B2 | 1/2003 | Huang et al. |
| 6,521,144 B2 * | 2/2003 | Takezawa et al. .......... 252/514 |

FOREIGN PATENT DOCUMENTS

| | | |
|---|---|---|
| EP | 0 969 056 | 1/2000 |
| GB | 2 084 466 | 4/1982 |
| GB | 2 153 235 | 8/1985 |
| GB | 2 225 580 | 6/1990 |
| JP | 59015401 | 1/1984 |
| JP | 11 222 402 | 5/1989 |
| WO | WO 86/02561 | 5/1986 |
| WO | WO 94/13870 | 6/1994 |
| WO | WO 95/05400 | 2/1995 |
| WO | WO 00/17254 | 3/2000 |
| WO | WO 01/11956 | 2/2001 |
| WO | WO 02/38649 | 5/2002 |

OTHER PUBLICATIONS

Vercruysse et al., "Synthesis and in Vitro Degradation of New Polyvalent Hydrazide Cross-Linked Hydrogels of Hyaluronic Acid", Bioconj. Chem., 8, 686-694, 1997.

O'Shannessy et al., Immobilization of Glycoconjugates by Their Oligosaccharides: Use of Hydrazido-Derivatized Matrices, Anal. Biochem., 191, 1-8, 1990.

Ito et al., Preparation of High Capacity Affinity Adsorbents Using New Hydrazino-Carriers and Their Use for Low and High Performance Affinity Chromatography of Lectins, J. Biochem. (Tokyo), 99, 1267-1272.

Junowicz et al., The Derivatization of Oxidized Polysaccharides for Protein Immobilization and Affinity Chromatography Biochim. Biophys. Acta 428, 157-165, 1976.

Miron et al., Polyacrylhyrdazio-Agarose: Preparation via Periodate Oxidation and use for Enzyme Immobilization and Affinity Chromatography, J. Chromatogr., 215, 55-63, 1981.

Heimgartner, et al., Polyacrylic Polyhydrazides as Reagents for Detection of Glycoproteins, Anal. Biochem., 181, 182-189, 1989.

Fleminger et al., Oriented Immobilization of Peridate-Oxidized Monoclonal Antibodies on Amino and Hydrazide Derivatives of Eupergit C, Applied Biochem., 23, 123-137, 1990.

Del Rosso et al., Binding of the Basement-Membrane Glycoprotein Lamnin to Glycosaminoglycans, Biochem. J., 199, 699-704, 1981.

Henderson et al., Immobilised Phosphines Incorporation the Chiral Biopolymers Chitosan and Chitin, J. Chem. Soc., Chem. Commun., 9, 1863-1864, 1994.

Petach et al., A New Coupling Reagent for the Covalent Immobilisation of Enzymes, J. Chem. Soc., Chem. Commun., 17, 2181-2182, 1994.

Cochrane et al., Application of Tris(hydroxymethyl) Phophine as a Coupling Agent for Alcohol Dehydrogenase Immobilization, Enzyme Microbial Technol., 18, 373-378, 1996.

Inman et al., Synthesis of Large Haptenic Compounds Having a Covalent Functional Group That Permits Convalent Linkage to Proteins, Cell Surfaces, Immunochemistry, 10, 153-163, 1973.

Ellis et al., Water-Soluble Tris(hydroxymethyl) Phospine Complexes with Nickel, Palladium, and Platinum, Inorg. Chem., 31, 3026-3033, 1992.

Lin et al., Preparation of Surface-modified Albumin Nanospheres, Biomaterials, V. 18, N. 7, 559-565, 1997.

Marconi et al., New Polyurethane Compsitions able to bond high Amounts of both Albumin and Heparin, V. 16, N. 6, 449-456, 1995.

Oswald et al., "Properties of a Thermostable B-Glycosides Immobilized Using Tris(hydroxymethyl) Phosphine as a Highly Effective Coupling Agent", Enzyme Microbial Technol., 23, 14-19, 1998.

Isosaki et al., Immobilization of Protein Ligands with Methyl Vinyl Ether-maleic Anhydride Copolymer, J. Chromatogr., 597, 123-128, 1992.

Patent Abstracts of Japan vol. 1999, No. 13, Nov. 30, 1999 & JP 11 222402 A (Osaka Gas Co. Ltd), Aug. 17, 1999 abstract.

* cited by examiner

CONDUCTIVE POLYMER-BASED MATERIAL

CROSS REFERENCE TO OTHER APPLICATIONS

This application claims priority under 35 U.S.C. § 119(e) of U.S. Provisional Application Ser. No. 60/366,100, filed on Mar. 20, 2002, the disclosure of which is herein incorporated by reference.

STATEMENT REGARDING FEDERALLY SPONSORED RESEARCH OR DEVELOPMENT

This Invention was made with U.S. Government support under NREL Subcontract NO. XXE-9-29058-01, Prime Contract No. DE-AC36-98GO10337 awarded by the Department of Energy. The U.S. Government has certain rights in this invention.

BACKGROUND

In many electronic devices, such as light emitting diodes ("LED") and LED displays, there is a need for electrically conductive, transparent electrodes. Typically, glasses or plastic sheets vapor-deposited with metal oxides have been employed for these electrically conductive, transparent electrodes. In particular, materials vapor-deposited or sputtered with indium tin oxide (ITO) have good properties. However, the production of such electrically conductive, transparent electrodes by sputtering under vacuum is very costly.

As a result, less costly alternatives have been proposed for electrically conductive, transparent electrodes. For instance, the production of conductive coatings based on organic conductive materials has been investigated. Conductive coatings based on mixtures of neutral polythiophenes and organic compounds containing dihydroxy or polyhydroxy and/or carboxyl groups or amide groups or lactam groups have been previously disclosed. In certain applications, these conductive coatings may be satisfactory; however, these conductive coatings may not have sufficient optical clarity or conductivity for certain applications, such as organic light emitting devices, and may be difficult to apply to a substrate.

Thus, there is a continuing need for organic conductive coatings that provide a cost advantage over materials vapor-deposited with metal oxides and that have improved optical and electrical properties compared to known organic conductive coatings.

SUMMARY

One or more of the foregoing needs may be met by the coating compositions and conductive materials described herein. These compositions and materials generally include (i) a polymeric composition including a polymer having side chains along a backbone forming the polymer, at least two of the side chains being substituted with a heteroatom selected from oxygen, nitrogen, sulfur, and phosphorus and combinations thereof; and (ii) a plurality of metal species distributed within the polymer. As employed herein, the "metal species distributed within the polymer" includes metal species which may be bonded, coordinated, chelated, suspended, and/or dispersed within the polymeric material. The metal species are typically homogenously distributed throughout the polymeric material. In many suitable embodiments of the polymer-based material, the metal species are present as a uniformly dispersed mixture at the molecular or ionic level in the polymeric material, i.e., as a solution of the metal species in the polymeric material. In certain embodiments, the metal species are present in a sufficient amount to provide a semi-conductive or conductive polymer-based material.

The metal species may be metal elements in an oxidized and/or neutral state. The metal species may be at least partially present in a cationic state. For example, at least a portion of the metal species may be present in the form of a metal salt (e.g., as an organic soluble metal salt). In one embodiment, at least a portion of the heteroatoms in the polymer sidechains form part of a polermized goborocgenyl, a chelation complex with some or all of the metal species.

Examples of suitable metal species for use in the present compositions include species of one or more of the following elements: titanium, vanadium, chromium, manganese, iron, cobalt, nickel, copper, zinc, boron, zirconium, niobium, molybdenum, technetium, ruthenium, rhodium, palladium, silver, cadmium, aluminum, hafnium, tantalum, tungsten, rhenium, osmium, iridium, platinum, gold, mercury, gallium, indium, thallium, scandium, yttrium, tin, antimony, lead, bismuth, and germanium species, and mixtures thereof. In some embodiments, a metal species is suitably chosen from smaller subsets of the aforementioned metal species. For example, in one embodiment, the metal species may include zinc, aluminum, iron, silver, copper, gold, nickel, titantium, chromium, or platinum species, or a combination thereof. Silver and copper species are particularly suitable for use in forming the present conductive materials.

The metal species are typically present in a concentration effective to provide a material with a resistivity of no more than about 20,000 ohm-centimeters. For example, to achieve a desirable conductivity, a metal species (e.g., silver or copper), may be present at a sufficient concentration to reduce the resistivity of the material to the level necessary to achieve the desired conductivity.

The present coating compositions typically also include an organic solvent. For example, coating compositions may be formed by contacting the polymeric material and the metal species present as a component of an organic soluble metal salt in an organic solvent. Such coating compositions can be used to form conductive thin films or other conductive materials. Conductive coatings and materials, as described herein, can be particularly useful as the thin film conducting and semi-conducting layers in organic electronic devices, such as organic electroluminescent devices and organic thin film transistors.

The polymer used in the polymeric composition preferably comprises a polymer having side chains along a backbone forming the polymer wherein at least two of the side chains contain an amino group (—NRH, —NH$_2$, —NRH$_2^+$, —NH$_3^+$). In one example embodiment, the polymer includes a polyamide having amino substituted alkyl chains on one side of the polymer backbone. The side chains on the polymer may include alkyl chain having 1 to 50 carbons or, more suitably, alkyl chain having 8 to 20 carbon atoms. A crosslinking agent may be used with the polymer in many embodiments of the polymeric composition. Typically, the crosslinking agent contains at least two functional groups capable of reacting with the amino groups of the polymer used in the polymeric composition of the coating or material. In one example of the crosslinking agent used in the polymeric composition, the crosslinking agent is selected from polyaldehyde crosslinking agents (e.g., monomeric or oligomeric molecules having 2 or more —CHO groups); phosphines having the general formula (A)$_3$P, wherein A is hydroxyalkyl; epoxy molecules containing the glycidyl ether group in at least two sites; isocyanate molecules containing the isocyanate functionality in at least two sites; and mixtures thereof.

In one example embodiment of the composition, the versatile chemical methodology of the composition allows for the deposition of a conductive material as a coating on a substrate. The resulting coating can include a two dimensional polymer having a backbone of repeating β-amino acid units with long aliphatic side-chain and free —NRH and/or —NH$_2$ substituents. Such polymeric materials may be synthesized by condensation of monomers selected from unsaturated carboxylic acids, esters of unsaturated carboxylic acids, anhydrides of unsaturated carboxylic acids, and mixtures thereof with one or more amines. It may also be desirable to use an unsaturated lactone such as 2(5H)-furanone. Examples of suitable unsaturated carboxylic acid anhydrides and unsaturated carboxylic acid esters include maleic acid derivatives (such as anhydride, esters, and so on). As employed herein, the term "esters of unsaturated carboxylic acids" (or "unsaturated carboxylic acid esters") refers to partial esters, complete esters (i.e., fully esterified polycarboxylic acids) and mixtures thereof. For example suitable maleic acid esters may include partial esters (e.g., maleic acid monoethyl ester ("MAEE")) and/or complete esters (e.g., maleic acid diethyl ester). The selected monomer may be reacted with a long-chain amine (e.g., tetradecylamine, ("TDA")), and/or a polyamine (e.g., a polyalkylene polyamine such as polyethyleneimine, pentaethylenehexamine ("PEHA"), tetraethylene-pentamine, or a mixture thereof).

In one embodiment, the polymer-based material may include a polymer, and a plurality of metal species (e.g., zinc, aluminum, silver, copper, or nickel) distributed within the polymer, where the polymer is synthesized by (i) reacting an α,β-unsaturated lactone and a first amine to form an intermediate reaction product, wherein the first amine is selected from RR$_1$NH, RNH$_2$, RR$_1$NH$_2^+$, RNH$_3^+$ and mixtures thereof, where R and R$_1$ can be the same or different and each contain from 1 to 50 carbon atoms, preferably from about 8 to 20 carbon atoms, and are optionally substituted with heteroatoms oxygen, nitrogen, sulfur, and phosphorus and combinations thereof, and (ii) reacting the intermediate reaction product and a second amine to form a polyamide, wherein the second amine is selected from R$_2$R$_3$NH, R$_2$NH$_2$, R$_2$R$_3$NH$_2^+$, R$_2$NH$_3^+$ and mixtures thereof, wherein R$_2$ and R$_3$ can be the same or different and each contain from 1 to 50 carbon atoms, preferably from about 8 to 20 carbon atoms, and at least a portion of the R$_2$ groups are substituted with heteroatoms selected from oxygen, nitrogen, sulfur, phosphorus and combinations thereof. The polyamide may optionally be crosslinked by reaction with a crosslinking agent comprising at least two functional groups capable of reacting with one or more of the heteroatoms.

In the crosslinked polymer, metal species are distributed within the polymer. The metal species may be bonded (e.g., covalently, ionically, or otherwise to oxygen, nitrogen, sulfur, and/or phosphorus heteroatoms or functional groups including these heteroatoms (e.g., nitrogen within an amino group)), and/or coordinated, chelated, suspended, or dispersed within the polymer.

The organic, conductive coatings and materials described herein generally have an improved conductivity compared to known organic conductive coatings and materials. For example, the present coating compositions can be used to provide polymer-based materials possessing a resistivity of no more than 20,000 ohm-centimeters, more suitably no more than 10,000 ohm-centimeters and, in some instances, no more than 1,000 ohm-centimeters. In addition, the coatings and materials described herein generally have improved optical properties, such as optical clarity, compared to known organic conductive coatings and materials.

The coatings described herein may be manufactured at a lower cost and without the extreme equipment requirements in comparison to coatings prepared by vapor-deposition with metal oxides. In some embodiments, the present coating compositions may be easily applied to a substrate, using techniques such as ink jetting, compared to known organic conductive coatings.

The conductive coatings described herein may also be useful as thin film conducting and semi-conducting layers in organic electronic devices such as organic electroluminescent devices ("OLEDs") and organic thin film transistors.

These and other features, aspects, and advantages of the present composition and methods will become apparent upon consideration of the following detailed description, drawings, and appended claims.

DETAILED DESCRIPTION

Figure 1:
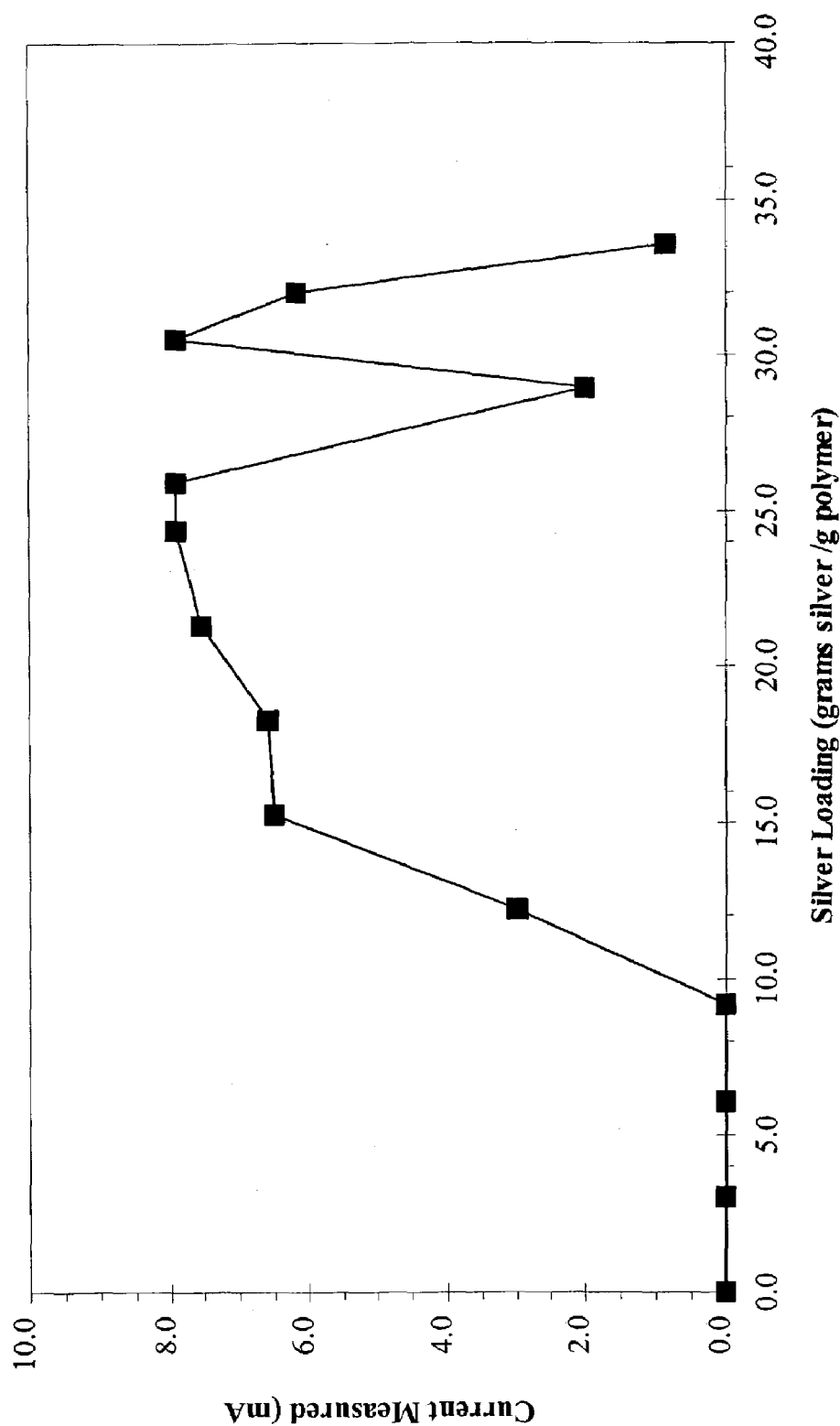
FIG. 1 is a graph showing measured current for different silver loading levels in an example conductive coating.

Described herein is a coating and conductive material comprising (i) a polymeric composition including a polymer having side chains along a backbone forming the polymer, at least two of the side chains being substituted with a heteroatom selected from oxygen, nitrogen, sulfur, and phosphorus and combinations thereof; and (ii) a plurality of metal species distributed within the polymer. The metal species may be metal elements in an oxidized and/or neutral state. In one embodiment, at least a portion of the heteroatoms form part of a chelation complex with at least one of the metal species.

Examples of suitable metal species for use in the present compositions include species of one or more of the following elements: titanium, vanadium, chromium, manganese, iron, cobalt, nickel, copper, zinc, boron, zirconium, niobium, molybdenum, technetium, ruthenium, rhodium, palladium, silver, cadmium, aluminum, hafnium, tantalum, tungsten, rhenium, osmium, iridium, platinum, gold, mercury, gallium, indium, thallium, scandium, yttrium, tin, antimony, lead, bismuth, germanium species. In some embodiments, it may be desirable to select one or more metal species from smaller groups of metal species. For example, it may be desirable to select a metal species from the group consisting of titanium, vanadium, chromium, manganese, cobalt, zinc, boron, zirconium, niobium, molybdenum, technetium, ruthenium, rhodium, palladium, cadmium, aluminum, hafnium, tantalum, tungsten, rhenium, osmium, iridium, platinum, mercury, gallium, indium, thallium, scandium, yttrium species, and mixtures thereof. In another embodiment, a metal species may be selected from zinc, aluminum, iron, silver, copper, gold, nickel, titanium, chromium, platinum species, and mixtures thereof. In another embodiment, a metal species may be selected from silver or copper species. The metal species may be present as a cation in a metal salt, preferable an organic soluble metal salt. To achieve a desirable conductivity, the selected metal species (e.g., silver or copper), may be present at a particular concentration.

An example polymer used in the polymeric composition of the conductive coating or material comprises a polymer having side chains along a backbone forming the polymer wherein at least two of the side chains contain an amino group (—NRH, —NH$_2$, —NRH$_2^+$, —NH$_3^+$). In one example embodiment of the polymer, the polymer is a polyamide synthesized using the polymerization reactions that are shown in Scheme 1, although other polymerization reactions may occur as well. Looking at Scheme 1, it can be seen that the polyamide can be synthesized using an $\alpha,\beta$-unsaturated gamma lactone, such as 2(5H)-furanone, as an agent to effect the regular, sequential alignment of side chains along a polyamide backbone. The furanone undergoes facile reaction with a primary amine by Michael-type addition to yield $\alpha,\beta$-amino gamma lactone which then polymerizes to form a polyamide chain with the pendant side chain. Depending on the side group (R), the method can produce many different types of polyamides, (e.g., linear polyamides). When the R group is selected from fatty alkyl and polyamine (such as polyethyleneimine, pentaethylenehexamine, tetraethylenepentamine, or a mixture thereof), a polymer having fatty alkyl chains and amino substituted alkyl chains on one side of the polymer backbone and hydroxymethyl groups on the other side of the backbone can be formed. See e.g., Scheme 2 which shows illustrative polyamides having amino groups that are suitable for forming sample conductive coatings. This example two-dimensional polymer has a backbone of repeating β-amino acid units with fatty alkyl (e.g., tetradecyl) and polyalkylene polyamine (e.g., derived from polyethyleneimine, pentaethylenehexamine, tetraethylenepentamine, or a mixture thereof) side chains randomly distributed along the chain. By virtue of its amphithetic properties, the two-dimensional polymers are easily soluble in both water and most organic solvents (e.g., alcohols, tetrahydrofuran, chloroform, toluene, N,N-dimethylformamide, and the like). In one embodiment, linear polymers can be created, wherein the unsaturated lactones react with the primary pendant amino groups on polyalkylene polyamines.

One useful polyamide is formed by reacting an $\alpha,\beta$-unsaturated lactone and a first amine to form an intermediate reaction product, wherein the first amine is selected from RR$_1$NH, RNH$_2$, RR$_1$NH$_2^+$, RNH$_3^+$ and mixtures thereof, wherein R and R$_1$ can be the same or different and each contain from 1 to 50 carbon atoms, preferably from about 8 to 20 carbon atoms, and are optionally substituted with heteroatoms oxygen, nitrogen, sulfur, and phosphorus and combinations thereof; and (ii) reacting the intermediate reaction product and a polyamine to form the polyamide, wherein the second polyamine is selected from R$_2$R$_3$NH, R$_2$NH$_2$, R$_2$R$_3$NH$_2^+$, R$_2$NH$_3^+$ and mixtures thereof, wherein R$_2$ and R$_3$ can be the same or different and each contain an amino group (—NRH, —NH$_2$, —NRH$_2^+$, —NH$_3^+$) and from 1 to 50 carbon atoms, preferably from about 8 to 20 carbon atoms, and are optionally substituted with heteroatoms oxygen, nitrogen, sulfur, and phosphorus and combinations thereof, wherein, optionally, multiples of the R, R$_1$, R$_2$, and R$_3$ may be in a vertically aligned spaced relationship along a backbone formed by the polyamide. In one example embodiment, R, R$_1$, R$_2$, and R$_3$ may be selected from alkyl, alkenyl, alkynyl, cycloalkyl, aryl, aralkyl, hydroxyl, nitrile, carboxyl, sulfate, phosphate, sulfonyl, trialkylammonium and combinations thereof and optionally can be substituted with a halogen selected from the group consisting of chlorine, iodine, bromine, fluorine and combinations thereof. The R, R$_1$, R$_2$, and R$_3$ groups may be the same or different depending on the desired structure for the final polyamide. In other words, the first amine and the second amine used in the polymerization process may be the same or different. In one embodiment, R and R$_1$ are alkyl and the second amine is a polyalkylene polyamine. In another embodiment, the first amine is tetradecylamine and the polyalkylene polyamine is polyethyleneimine, pentaethylenehexamine, tetraethylenepentamine, or a mixture thereof. It may be desirable to select R, R$_1$, R$_2$, and R$_3$ alkyl groups of a particular length, (e.g., about C$_{8-20}$). Proper selection of the amines for inclusion in the polymer may create a two-dimensional structure such that one "side" of the polymer is non-polar or lipophilic and the other side of the polymer is polar or hydrophilic, thereby preserving the "sidedness" of the polymer.

In another example of the polymer used in the polymeric composition of the conductive coating or material, the polymer is a polyamide synthesized using the polymerization reaction disclosed in U.S. Pat. No. 6,495,657, entitled "Two Dimensional Polyamides Prepared from Unsaturated Carboxylic Acids and Amines," issued Dec. 17, 2002, the disclosure of which is incorporated herein by reference. U.S. Pat. No. 6,495,657 describes a polymerization process in which a monomer selected from unsaturated carboxylic acids, esters of unsaturated carboxylic acids, anhydrides of unsaturated carboxylic acids, and mixtures thereof is reacted with a first amine to form an intermediate reaction product, and then the intermediate reaction product is reacted with a second amine which includes a polyamine to form a polyamide in which at least a portion of the side chains along a backbone forming the polyamide are amino substituted alkyl chains. See e.g., Schemes 3 and 4 (where $R_1$ can include an amino group) show a process for synthesizing a polyamide having amino groups that can be suitable for forming an example conductive coating. The process for producing this polyamide typically involves reacting a monomer selected from unsaturated carboxylic acids, esters of unsaturated carboxylic acids, anhydrides of unsaturated carboxylic acids and mixtures thereof with a first amine to form an intermediate reaction product in the reaction mixture, wherein the first amine is selected from $RR_1NH$, $RNH_2$, $RR_1NH_2^+$, $RNH_3^+$ and mixtures thereof, wherein R and $R_1$ can be the same or different and each contain from 1 to 50 carbon atoms, preferably from about 8 to 20 carbon atoms, and are optionally substituted with heteroatoms oxygen, nitrogen, sulfur, and phosphorus and combinations thereof. The reaction of the monomer and the first amine forms an intermediate reaction product in the reaction mixture. The intermediate reaction product is then reacted with a second amine selected from $R_2R_3NH$, $R_2NH_2$, $R_2R_3NH_2^+$, $R_2NH_3^+$ and mixtures thereof, wherein $R_2$ and $R_3$ can be the same or different and each contain an amino group ($-NRH$, $-NH_2$, $-NRH_2^+$, $-NH_3^+$) and each contain from 1 to 50 carbon atoms, preferably from about 8 to 20 carbon atoms, and are optionally substituted with heteroatoms oxygen, nitrogen, sulfur, and phosphorus and combinations thereof. The reaction of the intermediate reaction product with the second amine forms the polyamide in the reaction mixture. The polyamide may then be separated from the reaction mixture. A polyamide produced in accordance with the described method may include multiples of the R, $R_1$, $R_2$, and $R_3$ groups in vertically aligned spaced relationships along a backbone formed by the polyamide.

Suitable unsaturated carboxylic acids, esters of unsaturated carboxylic acids, and anhydrides of unsaturated carboxylic acids for use as the monomer in this polymerization process may have for example from 3 to 18 carbon atoms in the molecule. Of this group of acids, the monocarboxylic acid, acrylic acid, and the dicarboxylic acid, maleic acid, are particularly suitable. Of this group of esters, maleic acid monoesters (such as maleic acid monoethyl ester, ("MAEE")) are can be used quite suitably. A non-limiting example of anhydrides of the unsaturated carboxylic acids is maleic anhydride. In one example embodiment, R, $R_1$, $R_2$, and $R_3$ may be selected from alkyl, alkenyl, alkynyl, cycloalkyl, aryl, aralkyl, and combinations thereof. Each of such groups may optionally be substituted with a halogen selected from the group consisting of chlorine, iodine, bromine, fluorine and combinations thereof. The R, $R_1$, $R_2$, and $R_3$ groups may be the same or different depending on the desired structure for the final polyamide. In other words, the first amine and the second amine used in the polymerization process may be the same or different. In one embodiment, R and $R_1$ are alkyl and the second amine is a polyalkylene polyamine. In another embodiment, the first amine is tetradecylamine and the polyalkylene polyamine is pentaethylenemine or tetraethylenepentamine. Proper selection of the amines for inclusion in the polymer may create a two-dimensional structure such that one "side" of the polymer is non-polar or lipophilic and the other side of the polymer is polar or hydrophilic, thereby preserving the sidedness of the polymer.

In the polymeric composition of the conductive coating or material, either of the example polymers described above may be crosslinked using a crosslinking agent that contains at least two functional groups capable of reacting with the heteroatoms (e.g., nitrogen atoms in amino groups) of the polymer. The example polyamides can be crosslinked using a polyaldehyde crosslinking agent. Some suitable polyaldehyde crosslinking agents are monomeric or oligomeric molecules having 2 or more —CHO groups. Typically, the —CHO groups will crosslink the example polyamides between amino groups on the polyamide. Polyaldehyde compounds useful for crosslinking the polyamide include aliphatic and aromatic polyaldehyde compounds having a polyaldehyde functionality of at least 2. The polyaldehyde compounds can also contain other substituents which do not substantially adversely affect the reactivity of the —CHO groups during crosslinking of the polyamide. The polyaldehyde compound can also comprise mixtures of both aromatic and aliphatic polyaldehydes and polyaldehyde compounds having both aliphatic and aromatic character. Non-limiting examples of polyaldehyde crosslinking agents include glutaraldehyde, glyoxal, succinaldehyde, 2,6-pyridenedicarboxaldehyde, and 3-methyl glutaraldehyde. The amount of polyaldehyde and the amount of polyamide used in the crosslinking process can be varied depending upon the particular crosslinking agent utilized, the reaction conditions and the particular product application contemplated.

The present polyamides can also often be crosslinked using a phosphine crosslinking agent having the general formula $(A)_3P$ and mixtures thereof, wherein A is hydroxyalkyl. For example, the A groups of the phosphine crosslinking agent undergo a spontaneous Mannich-type reaction with side groups (e.g., amino groups) on the polymer under mild conditions (pH 7, aqueous or organic media, room temperature, 2–24 hours). This results in the formation of an aminomethyl-phosphine linkage ($N-CH_2-P-CH_2-N$) which is much less susceptible to enzyme deactivation and hydrolysis at a low pH than other known crosslinkages. The phosphine crosslinking agent has many other important features. For example, the phosphine crosslinking agent has a high reactivity to amino groups under mild conditions (room temperature, in aqueous or organic media, pH 2–9, and a pot life extending to several hours). The resulting Mannich base type products formed from the phosphine crosslinking agent show a higher stability over that provided by glutaraldehyde in that a polymer crosslinked by glutaraldehyde containing 10% phosphine crosslinking agent was found to withstand low pH (pH 2–3) and high temperature conditions (boiling water poured into a large beaker followed by the addition of the coated plates without additional heating for 30 minutes) without deterioration. The phosphine crosslinking agent offers the benefits of operational simplicity, good biocompatibility, and low cost. The phosphine crosslinking agent can also react with the substrate to create tightly bound anchors between the polyamide coating and the substrate. Non-limiting examples of phosphine crosslinking agents include tris(hydroxymethyl)phosphine, tris(1-hydroxyethyl)phosphine, and tris(1-hydroxypropyl) phosphine. In certain circumstances, it may be cost effective to form the phosphine crosslinking agent in situ such as by the reaction of tetrakis (hydroxymethyl)phosphonium chloride and triethylamine. The amount of crosslinking agent and the amount of polymer used to produce the polymeric composition can be varied depending upon the particular crosslinking agent utilized, the reaction conditions and the particular product application contemplated. For example, the ratio of A groups in the phosphine crosslinking agent to the total of amount of amino groups in the polyamide can be varied to achieve a predetermined level of crosslinking. Additional suitable crosslinking agents include epoxides, isocyanates, and anhydrides.

The amount and/or type of metal species associated with the crosslinked polymer used may vary depending on the particular material employed and ultimate desired effect. For instance, the amount and/or type of a selected metal species associated with the crosslinked polymer used in a particular application may vary depending on the amount of conductivity desired in a layer of the conductive coating or material.

A selected metal species may be associated with the crosslinked polymer using chelation techniques. Advantageously, the chelating capabilities of the polymer are superior to those of the similar amino-functional two dimensional polymers. Molecules containing donor atoms like nitrogen, oxygen, sulfur, phosphorus, arsenic that can be combined with a metal species or a central atom are called a chelating agent. The donor atoms can coordinate with the metal species to form a structure called a chelation complex or a chelate. If the coordination number of the metal or central atom is greater then the number of donation atoms in the ligand, more than one ligand molecule can bind to the metal or central atom. A ligand with enough donor atoms can bind more than one metal species or central atom. The metal species or central atom may be the same or different.

The stability of complexes formed between Lewis acids (e.g. metals and/or metal ions) and Lewis bases (N, O, S, etc.) is dependant on the electronegativity/electropositivity of the species involved, and their polarizability (hard/soft interaction). Metal ions that are readily polarized are referred to as soft and prefer soft Lewis bases. Alternatively metal ions that are not readily polarized are referred to as hard and form more stable complexes with hard Lewis bases.

By including donor atoms, such as oxygen, nitrogen, sulfur, and phosphorus in the side chains of the polymer, a number of chelation sites are available to accept metal species. At least a portion of the donor atoms form part of a chelation complex with at least one of the metal species when they are reacted with the polymer. The metal species may be selected from or contain one or more of the following: titanium, vanadium, chromium, manganese, iron, cobalt, nickel, copper, zinc, boron, zirconium, niobium, molybdenum, technetium, ruthenium, rhodium, palladium, silver, cadmium, aluminum, hafnium, tantalum, tungsten, rhenium, osmium, iridium, platinum, gold, mercury, gallium, indium, thallium, scandium, yttrium, tin, antimony, lead, bismuth, germanium species, and mixtures thereof. Alternatively, a metal species may be selected from titanium, vanadium, chromium, manganese, cobalt, zinc, boron, zirconium, niobium, molybdenum, technetium, ruthenium, rhodium, palladium, cadmium, aluminum, hafnium, tantalum, tungsten, rhenium, osmium, iridium, platinum, mercury, gallium, indium, thallium, scandium, yttrium, tin, antimony, lead, bismuth, germanium species, and mixtures thereof. A metal species may be selected from a smaller subset of the aforementioned metal species where desirable. Preferably, a metal species may be selected from silver or copper species, which may be supplied by a metal salt.

The metal species, whether bonded, coordinated, chelated, suspended, and/or dispersed within the polymer, may provide for conductive paths when the polymer material is formed into thin films. The polymer in general is an insulating material. The addition of a metal species may be used for achieving the desired conductivity in the polymer. As the amount of the metal species is increased and reaches the "percolation threshold" concentration, the metal species come sufficiently into contact with each other so that a marked increase in conductivity is observed for the loaded polymer. In this example, the desired conductivity is obtained by controlling the loading of the conductive species, and the conductivity of such a film depends greatly on the concentration of the conductive species in the film or coating. Low concentrations lead to low levels of conductivity with high activation energy. As the film is loaded with more conductive species, the activation energy falls and continuous paths extending through the coating are developed. Where these continuous paths begin to form is the percolation threshold. The coating transitions from insulator to conductor. This morphology is inverted for higher concentrations of metal species, where insulating inclusions form in the conducting matrix.

A conductive coating can be produced by known methods, for example, by spraying, application by a doctor blade, dipping, application with roller applicator systems, by printing processes such as gravure printing, silk screen printing, curtain casting and inkjet printing. The thickness of the coatings, depending on the intended use and requirements as to transparency and conductivity, is from 100 nanometers to 2,000 nanometers, preferably from 100 nanometers to 1000 nanometers. The resistivity of the coatings is generally 20,000 ohm-centimeters or less, preferably 10,000 ohm-centimeters or less, and more preferably 1,000 ohm-centimeters or less.

The coatings and materials may be used in areas which require good electrical conductivities, for example, as electrodes in light emitting diode and other electroluminescent displays, in thin film transistors ("TFTs")in solid electrolyte capacitors, for the deposition of metals such as copper and/or nickel, for example, in the manufacture of printed circuits, in solar cells, in electrochromic displays or for the screening of electromagnetic radiation or for leading away electrical charges, for example, in picture tubes or as anticorrosive coatings on metals, or for the production of touch screens. Other areas of application are systems for picture production. The conductive coatings can optionally be coated with further layers, for example, UV-curing coatings or organic or inorganic scratch-resistant coatings.

The conductive coating may be applied to any substrate that is considered useful in applications where conducting or semi-conducting properties are advantageous. The conductive coatings may be applied to organic and inorganic substrates. Examples of suitable inorganic substrates are glass, oxides or oxidic or nonoxidic ceramics such as aluminum oxide, silicon nitride. Examples of suitable organic substrates are sheets or other moldings of pure organic polymers, copolymers or mixtures of, for example, polycarbonate, polystyrene, polyacrylates, polyesters such as polyethylene terephthalate, polybutylene terephthalate, polyethylene naphthalate, polyamides, polyimides, optionally glass-fiber reinforced epoxy resins, cellulose derivatives such as cellulose triacetate, and polyolefins such as polyethylene, polypropylene. The particular substrate selected typically does not constitute a critical aspect, other than to serve as a support substrate for the conductive coating.

A layer of a conductive coating may be prepared using various methods as follows. A solution of the polymer having side chains along a backbone forming the polymer is prepared in a suitable solvent (typically organic), such as isopropanol. The polymer concentration can vary from 0.001% to 100% and is typically from 1 to 20% depending on the desired coating concentration. A crosslinking agent or a mixture of crosslinking agents may then be added to the polymer solution. Nonlimiting examples of crosslinking agents include polyaldehydes, phosphines having the general formula $(A)_3P$, wherein A is hydroxyalkyl, and mixtures thereof. Examples of crosslinking agents include glutaraldehyde and tris(hydroxymethyl)phosphine. The phosphine crosslinking agent may be formed in situ such as by the reaction of tetrakis-(hydroxymethyl) phosphonium chloride and triethylamine. Epoxy and isocyanate crosslinkers can also be used. Nonlimiting examples of epoxy crosslinkers includes tris(2,3-epoxypropyl) isocyanurate; poly(bisphenol A co-epichlorohydrin), glycidal ether end capped; epichlorohydrin; poly(dimethylsiloxane), diglycidal ether end capped and poly(dimethylsiloxane), bis(3-aminopropyl) terminated. In addition, isocyanate crosslinkers can be used including but not limited to 1,6-hexamethylenediisocyanrate and 1,4-phenylenediisocyanate. Where desirable, crosslinking agents may be used to create a polymeric composition that possesses a certain "hardness," wherein "hardness" can be measured by standard tests such as those described in the Annual Book of ASTM Standards volume 06.01, (Test Designation: D 4752-87, Standard Test Method for Measuring MEK Resistance of Ethyl Silicate (Inorganic) Zinc-Rich Primers by Solvent Rub), the disclosure of which is incorporated herein by reference. This test can be modified to include the use of isopropanol, acetone, water, and/or any other solvent that might pose a significant problem to the crosslinked coating, the preferred solvent being isopropanol or water.

A metal species is also added to the polymer solution. In one example embodiment, the metal species is selected from or contain one or more of the following: titanium, vanadium, chromium, manganese, iron, cobalt, nickel, copper, zinc, boron, zirconium, niobium, molybdenum, technetium, ruthenium, rhodium, palladium, silver, cadmium, aluminum, hafnium, tantalum, tungsten, rhenium, osmium, iridium, platinum, gold, mercury, gallium, indium, thallium, scandium, yttrium, tin, antimony, lead, bismuth, germanium species, and mixtures thereof.

The solution of polymer, crosslinking agent, and compound having metal species (e.g., a metal salt such as an organic soluble metal salt), may then be applied to a substrate and the substrate may be heated or baked in an oven at 125° C. for one hour to complete the crosslinking process and create a crosslinked polymeric conductive coating on the substrate. This step may be repeated if necessary. Typically, the coatings are applied using a dipping process. However, the coatings can be spin coated, brushed, sprayed, sponged, or the like onto the substrate. As a result, at least a portion of the metal species form part of a chelation complex with donor atoms or functional groups having donor atoms and/or are distributed or dispersed in the polymer matrix as part of a crosslinked conductive coating deposited on the substrate.

A conductive coating may be used to form thin films or nano-composites useful in organic electroluminescent devices. An organic electroluminescent device may comprise a light emitting layer disposed between a pair of electrodes, and one or both of the electrodes may comprise a conductive coating as described herein. The organic electroluminescent device may be prepared by forming an electrode thin film of a conductive coating as described herein, forming a light emitting thin film layer on the electrode thin film, and forming the other electrode thin film on the light emitting layer. Suitable materials for the light emitting layer are disclosed in U.S. Pat. Nos. 6,207,301, 5,543,079 and 5,317,169, the disclosure of which are incorporated herein by reference. The conductive electrode layers are preferably transparent.

The electrode thin film of a conductive coating, as described herein, may be integrated in other positions in the structure of the organic electroluminescent device. The electrode thin film of a conductive coating may be applied for example in the form of a transparent conductive electrode between a transparent substrate and the light emitting layer. A suitable substrate would be a transparent substrate such as glass or a plastic films (e.g., polyesters, such as polyethylene terephthalate, polycarbonate, polyacrylate, polysulphone or polyimide film). Optionally, one of the electrodes may comprise a metallic conductive substance, which can be transparent. Metals such as aluminum, gold and silver or alloys or oxides thereof are suitable. These materials can be applied by techniques such as vapor deposition or sputtering. The organic electroluminescent device is brought into contact with the two electrodes by two electrical supply leads (for example, metal wires). When direct voltage is applied to the organic electroluminescent device, the organic electroluminescent device emits light.

A conductive coating or material as described herein may be used to form thin films or nano-composites useful in organic thin film transistors such as those described in U.S. Pat. No. 6,107,117, the disclosure of which is incorporated herein by reference. The organic thin film transistor includes a substrate over which a layer of an insulating material and a metal contact (gate electrode) are formed. Two additional metal contacts, the source electrode and the drain electrode, are formed over the layer of insulating material. A layer of organic semiconducting material is formed over and between the source electrode and the drain electrode. In another example of the organic thin film transistor, the gate electrode is formed between the substrate and the layer of insulating material, and the source electrode and the drain electrode are formed on the organic semiconducting material. The substrate of the organic thin film transistor can be made of conventional materials such as silicon, glass, or plastic. Any of the gate electrode, the semi-conducting layer, the source electrode and the drain electrode can comprise a conductive coating as described herein or another conventional material for these purposes such as gold, indium-tin-oxide (ITO) or conductive ink.

Additional Illustrative Embodiments

In one embodiment, the conductive material comprises a polymeric composition including a polymer having side chains along a backbone forming the polymer. In this embodiment, at least two of the sides chains may be substituted with one or more heteroatoms selected from oxygen, nitrogen, sulfur, phosphorus, and combinations thereof. The polymer may include a plurality of silver species distributed within the polymer at a concentration of at least 10 grams of the silver species per gram of the polymer. In another embodiment, the polymer may include a plurality of copper species distributed within the polymer at a concentration of at least 0.5 grams of the copper species per gram of the polymer.

Another embodiment provides a polymeric composition formed by a process comprising contacting a polymer with a solution which includes an organic solvent and an organic soluble metal salt. The polymer component commonly includes a polymeric composition including a polymer having side chains along a backbone forming the polymer, at least two of the side chains being substituted with one or more heteroatoms selected from oxygen, nitrogen, sulfur, phosphorus and combinations thereof. The organic soluble metal salt can include an organic soluble salt of iron, silver, copper, gold, nickel, titanium, vanadium, chromium, manganese, cobalt, zinc, boron, zirconium, niobium, molybdenum, technetium, ruthenium, rhodium, palladium, cadmium, aluminum, hafnium, tantalum, tungsten, rhenium, osmium, iridium, platinum, mercury, gallium, indium, thallium, scandium, yttrium, tin, antimony, lead, bismuth, or germanium, or a combination thereof.

In one embodiment of any of the described conductive materials, the conductive material comprises a polymeric composition including a polymer where R, R1, R2, and R3 are in vertically aligned spaced relationship along a backbone formed by the formed.

In another embodiment of any of the described conductive materials, the conductive material is substantially transparent. Further, any of the described conductive materials may be useful for forming transparent conductive layers in OLED devices.

In another embodiment of any of the described conductive materials, the conductive material has a resistivity of no more than 20,000 ohm-centimeters; preferably no more than 10,000 ohm-centimeters; and more preferably no more than 1,000 ohm-centimeters.

Any of the described conductive materials may be formed into conducting thin films or conducting nanocomposites.

In some embodiments, the conductive polymer-based material may be present as a coating on a substrate, e.g., in the form of a thin film. The surface of the substrate may be modified before application of the coating, such as by the introduction of amino functional groups onto the surface. This may be accomplished by treating the substrate surface with an amino-functional surface modifying agent. For example, the surface of a siloxane substrate, such as a polydimethylsiloxane substrate, may be modified by treatment with an amino-functional alkyl-trialkoxysilane reagent (e.g., 3-(2-(2-aminoethylamino)ethylamino) propyl-trimethoxysilane) to provide a substrate surface which includes pendant amino groups.

EXAMPLES

The following examples are illustrative and are not intended to limit the claimed invention in any way.

Example 1

Preparation of a Polyamide with Side Chains

A polymer with side chains was prepared as follows. First, 1.0 moles (144.1 grams) of maleic acid mono-ethyl ester ("MAEE")was dissolved in 100 grams of isopropanol in a break away resin kettle. The kettle containing the maleic acid mono-ethyl ester/isopropanol solution was then cooled in an ice bath with agitation. Second, 0.5 moles (160.7 grams) of commercially available tetradecylamine was dissolved in 250 grams of isopropanol and added slowly to the cooled maleic acid mono-ethyl ester solution with stirring. A Michael-type addition reaction product began to precipitate within 5 minutes. The tetradecylamine addition required about two hours with ice bath conditions being maintained throughout. Third, 58.1 grams (0.25 moles) of commercially available pentaethylenehexamine were added drop wise to the reaction solution over a two hour period. The reaction is removed from the ice bath at the end of the monomer addition and stirred for an additional 2 hours. The amount of pentaethylenehexamine charged is determined from the monomer charge from the formation of intermediate. After complete addition of the pentaethylenehexamine, the reaction kettle was removed from the cold bath with continuous stirring for another 2 hours.

Example 2

Preparation of a Substrate

Before application of a polymer coating to a substrate, the surface of the substrate was modified. Substrate surface modification was accomplished by adding 2 milliliters of 3-(2-(2-aminoethylamino)ethylamino) propyl-trimethoxysilane and 0.1 milliliters of glacial acetic acid to 50 milliliters of isopropanol. A polydimethylsiloxane substrate was then dip coated in this solution followed by a 125° C. cure cycle in a forced air oven for 15 minutes.

Example 3

Preparation of Substrates Having a Conductive Coating

A 3.3% w/w solution of the polyamide with side chains prepared in Example 1 was prepared in an isopropanol solution. Twelve different polymer coating solutions were then prepared by mixing 50 milliliters of the 3.3% solution of the polyamide, 1.5 milliliters of 50% glutaraldehyde, 0.5 milliliters of triethylamine, 1 drop of Triton™X 100 brand surfactant or other similar surfactant, 0.15 milliliters of 80% tris(hydroxymethyl)-phosphine, and twelve different weights (0 grams to. 130 grams) of an isopropanol soluble silver salt ($AgF_5C_3O_2$) to produce twelve conductive coatings having a silver level of 0 grams to 40 grams of silver per gram polymer. The surface modified substrates prepared above in Example 2 were then dipped in the polymer coating solution two times and heated by hot air at 120°–150° C. for 1 minute after each dip. The coated substrates were then hung in a 125° C. forced air oven to cure for 1 hour.

The conductive coatings formed on the substrate by the polymer system for metal chelation have excellent conductivity and acceptable optical clarity for potential use in the manufacture of organic light emitting diodes and other similar electrical devices. Current technology utilizes a polythiophene based material that has resistance on the level of $10^7$ to $10^8$ ohms. These example conductive coatings have a resistance of 10 to 100 ohms.

Example 4

Testing of Conductive Coatings

The coated substrates produced in Example 3 were tested for conductivity. FIG. 1 contains the initial conductivity collected on a conductivity apparatus. The sharp decrease in conductivity at approximately 29 g silver per gram polymer is likely related to an overloading of the polymer with silver. Even though the complex appears stable and soluble, the conductivity data indicates a definite change in the silver polymer complex. According to Blacher et aL (see Blacher, S.; Brouers, F.; Sarychev, A.; Ramsamugh, A.; and Gadeen, P.; *Langmuir*, 1996, 12, 183–188.), this is a common behavior for a percolation compound. Doing more complex conductivity measurements with a four-point conductivity probe supported these measurements.

Example 5

Preparation of Substrates Having a Conductive Coating

A 3.3% w/w solution of the polyamide with side chains prepared in Example 1 was prepared in an isopropanol solution. Eight different polymer coating solutions were then prepared by mixing 50 milliliters of the 3.3% solution of the polyamide, 1.5 milliliters of 50% glutaraldehyde, 0.5 milliliters of triethylamine, 1 drop of Triton™X 100 brand surfactant or other similar surfactant, 0.15 milliliters of 80% tris(hydroxymethyl)-phosphine, and eight different weights (30 grams to 90 grams) of an isopropanol soluble silver salt ($AgF_5C_3O_2$) to produce eight conductive coatings having a silver level of 9 grams to 28 grams of silver per gram of polymer. The surface modified substrates prepared above in Example 2 were then dipped in the polymer coating solution two times and heated by hot air at 120°–150° C. for 1 minute after each dip. The coated substrates were then hung in a 125° C. forced air oven to cure for 1 hour. Spin coating the coating onto a round or square substrate also produces acceptable results.

Example 6

Epoxy Crosslinking

Substrate coupons (1"×4") were prepared by dipping in methanol, then isopropanol. The coupons were then dipped in coupling agent solution (50 mL isopropyl alcohol, 1.0 mL of glacial acetic acid and 2.0 mL of CA0666, 3-[2-(2-aminoethylamino)ethylamino]propyl-trimethoxysilane) and placed on a hook in a forced air oven at 130° C. for 10 minutes. The coupons were removed from the oven and cooled to room temperature. The coating solution was prepared by mixing 10 mL of 1-methoxy-2-propanol, 50 mL of 8.5% polyamide with side chains (as prepared in Example 1) in solution in isopropanol. At this point the solution was sonicated to disperse undissolved solids throughout the solution. Poly(bisphenol-A co-epichlorohydrin) glycidyl ether endcapped (PBPA, 2.2 g) was added, followed by 0.25 mL of a surfactant (e.g. Triton™-X100 or similar surfactant). The mixture was then sonicated and stirred for 15 minutes. Finally, 1.0 mL of octamethylcyclotetrasilane was added. The coupons were dipped once in this coating solution then were air-dried and cured in a forced air oven for one hour at 150° C. The appropriate metal species were added to the desired level.

Example 7

Isocyanate Crosslinked Conductive Coatings

To a solution containing 5 ml of 1-methoxy 2-propanol and 1 g of the polyamide with side chains as prepared in Example 1 in 20 ml 2-propanol, was added one of the following chemicals: 0.14 g of 1,4-phenylenediisocyanate (MW=160.13); 0.22 g of Poly(phenylisocyanate-co-formaldehyde) (Mr=400, EW (equivalent weight)=133.33); 0.14 g of hexamethylenediisocyanate (MW=168.2); 0.95 g of Bayhydur BL-116 (protected polymeric aliphatic isocyanate, EW=564); or 0.41 g of Bayhydur 302 (polymeric aliphatic isocyanate, EW=243). 5 ml of triethylamine was added, and the sample coupons were dip coated or spin coated using the solution. The coated coupons were heated in a convection oven at 120° C. to allow the solvents to evaporate and facilitate reaction between the components.

Example 8

Testing of Conductive Coatings

Figure 2:
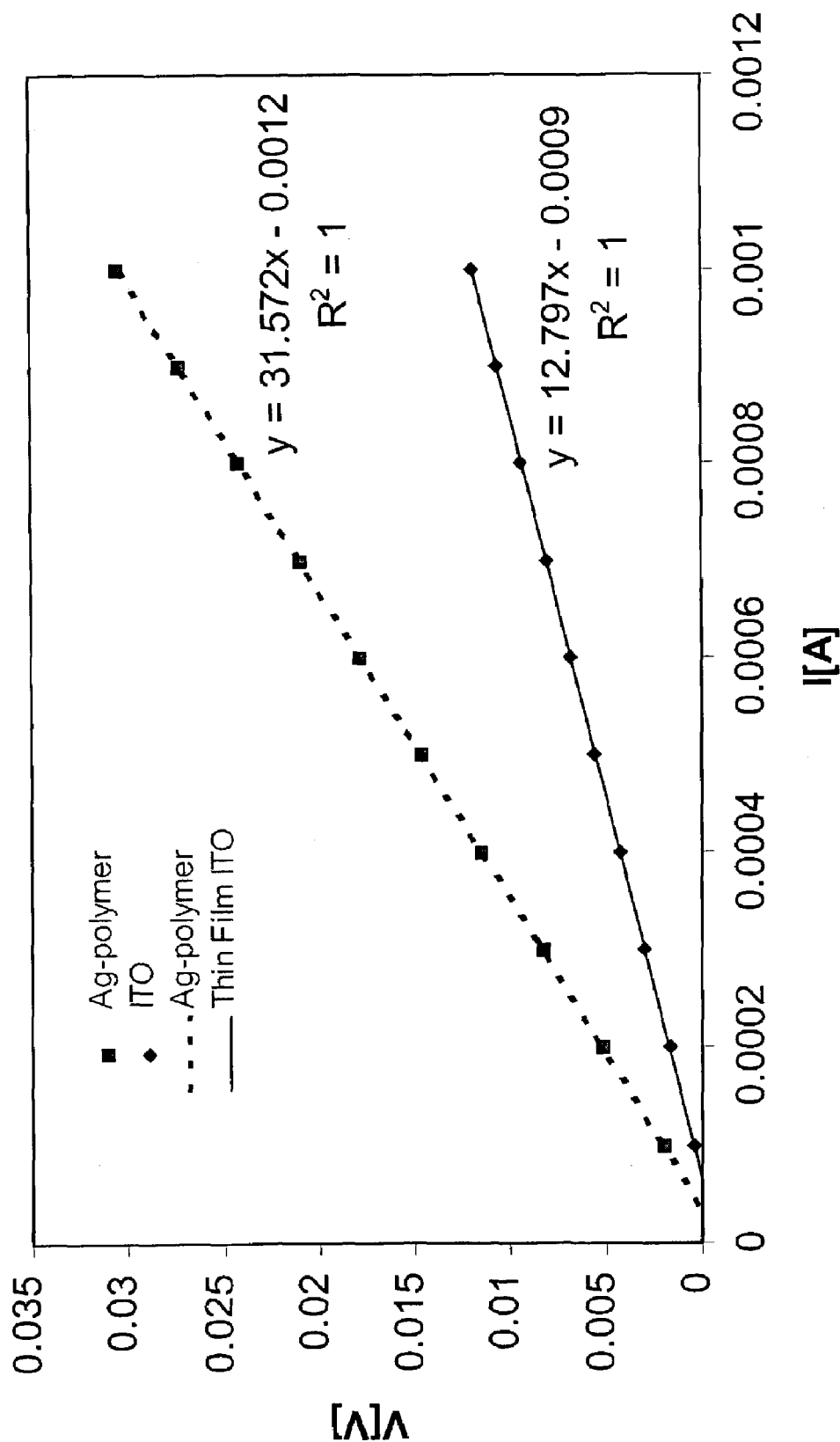
FIG. 2 shows a voltage-current curve measured for an example conductive coating compared to an indium tin oxide thin film with trend lines included for clarity.

The coated substrates produced in Example 5 were tested for conductivity and also compared to a comparative example of a indium tin oxide thin film. The samples were measured using a four-point-probe setup. An example of the measured voltage (V) versus applied current (I) characteristic is shown in FIG. 2. Specifically, FIG. 2 shows a voltage-current curve measured for an example conductive coating 21.5 grams silver per gram polymer and for the comparative example of a indium tin oxide thin film. Trend lines have been included for clarity.

Since all measured V-I curves are very linear, the sheet resistance can be determined from their slope. The film sheet resistance can be given by: Rs=4.53×V/I. Knowing the film thickness (in centimeters), the film resistivity (in ohm-cm.) can be calculated as Resistivity=Rs×film thickness. The film thickness was measured for each film using a Dectak™ 8000 profiler. All obtained electrical data are summarized in Table 1 for different polymers.

TABLE 1

Summary of the Organic Polymer Sheet Resistance and Film Resistivity.

| Sample Designation | Grams Ag per grams polymer | Sheet resistance Rs (Ohm square) | Film thickness (μm/10$^{-4}$ cm) | Resistivity (Ohm-cm) |
|---|---|---|---|---|
| (a) | 9.2 | 1.74 × 10$^8$ | ~0.5 | 8710 |
| (b) | 12.3 | 791.5 | ~0.3 | 0.0237 |
| (c) | 15.4 | 1.61 × 10$^3$ | ~0.5 | 0.0804 |
| (d) | 18.4 | 114.81 | ~0.4 | 0.0046 |
| (e) | 21.5 | 57.86 | ~0.4 | 0.0023 |
| (f) | 24.6 | 89.86 | ~0.5 | 0.0045 |
| (g) | 26.1 | 2.39 × 10$^8$ | ~0.6 | 14083 |
| (h) | 27.7 | 541.5 | ~0.8 | 0.0433 |
| Other Films | ITO | 143.02 | N/A | N/A |

From Table, 1, it can be seen that the organic polymer thin films can have dark resistivity lower than ITO thin films. At the same time, by changing the organic polymer doping (by Ag atoms) it is possible to change adjust its resistivity to almost any values. This property is very important and can be very useful for both organic thin-film transistors (OTFTs) and organic polymer light-emitting devices (OLEDs, also called electroluminescent devices). In the case of the OLEDs, it is desirable to have organic polymer with a low dark resistivity. In the case of the OTFTs, it is important that organic polymer has a high film resistivity. High film transparency is needed for OLEDs but this is not necessary for OTFTs.

Some further results are reported in FIG. 1 which shows the variation of the measured current with the film composition. From FIG. 1, it can be concluded that the highest conductivity was achieved for the film composition ranging from about 18.4 grams to about 24.6 grams of silver per gram of polymer in the film, although some conductivity was observed for the film composition ranging from approximately 9 grams to approximately 33 grams of silver per gram of polymer in the film.

From these examples, it is clear that both highly resistive and highly conductive organic polymer thin films can be prepared by changing the silver atom content in the film. The film resistivity can be changed by more than 6 orders of magnitude. This is a very attractive property of the organic polymers to be used for organic thin film devices.

Example 9

Preparation of a Substrate Having Another Conductive Coating

A 3.3% w/w solution of the polyamide with side chains prepared in Example 1 was prepared in an isopropanol solution. Twelve different polymer coating solutions were then prepared by mixing 50 milliliters of the 3.3% solution of the polyamide, 1.5 milliliters of 50% glutaraldehyde, 0.5 milliliters of triethylamine, 1 drop of Triton™X 100 brand surfactant or other similar surfactant, 0.15 milliliters of 80% tris(hydroxymethyl)-phosphine, and twelve different weights (0 grams to 130 grams) of an isopropanol soluble copper salt to produce twelve conductive coatings having a copper level 0 grams to 18.2 grams copper per gram of polymer. The surface modified substrates prepared above in Example 2 were then dipped in the polymer coating solution two times and heated by hot air at 120–150° C. for 1 minute after each dip. The coated substrates were then hung in a 125° C. forced air oven to cure for 1 hour. The initial transition from non-conducting to conducting is documented in Table 2. From Table 2, it can be concluded that copper concentrations of approximately 0.5 grams of copper per gram of polymer can produce conductive compositions.

TABLE 2

Onset of Conductivity for the Copper Polymer Complex.

| Sample | g Cu/g Polymer in final film | % Cu in Final Film | Does film conduct? |
|---|---|---|---|
| 1 | 0.64 | 21 | Yes |
| 2 | 0.32 | 16 | No |
| 3 | 0.11 | 8 | No |
| 4 | 0.05 | 4 | No |

The conductive coatings formed on the substrate by the polymer system for metal chelation have excellent conductivity and acceptable optical clarity for potential use in the manufacture of organic light emitting diodes and other similar electrical devices. Current technology utilizes a polythiophene based material that has resistance on the level of 10$^7$ to 10$^8$ ohms. These example conductive coatings have a resistance of 10 to 100 ohms.

Therefore, it can be seen that organic conductive coatings are provided that have improved conductivity compared to known organic conductive coatings. The organic conductive coatings also have improved optical clarity compared to known organic conductive coatings. The organic conductive coatings provide a cost advantage over materials vapor-deposited with metal oxides, and are useful as the thin film conducting and semi-conducting layers in organic electronic devices such as organic electroluminescent devices and organic thin film transistors.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

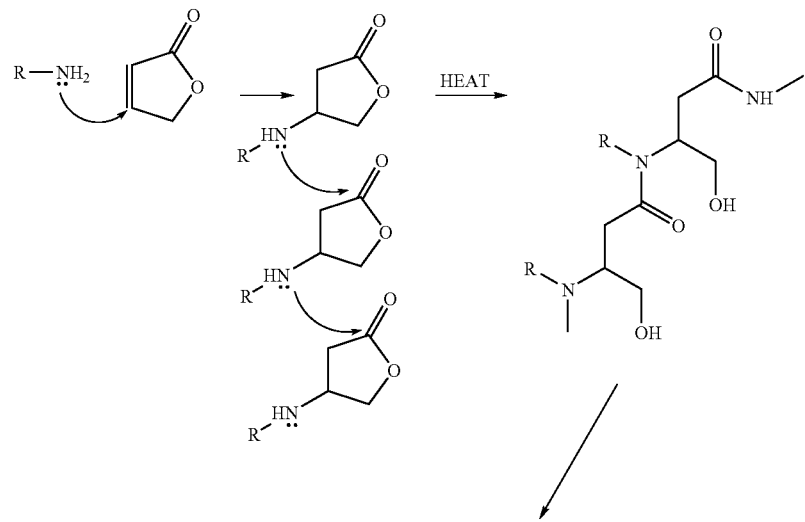
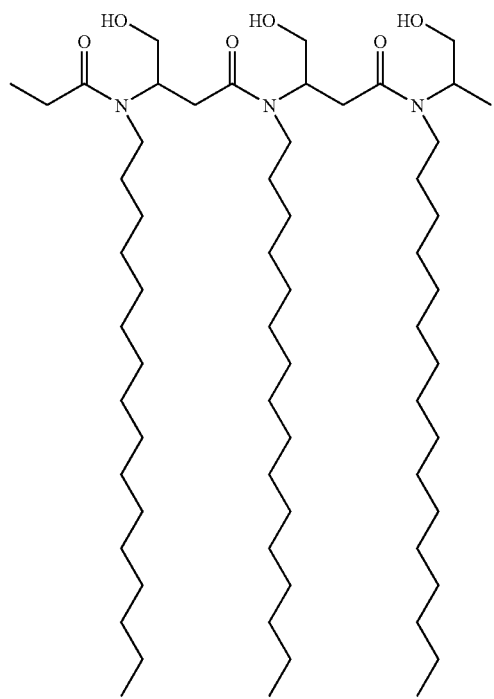

Scheme 2.
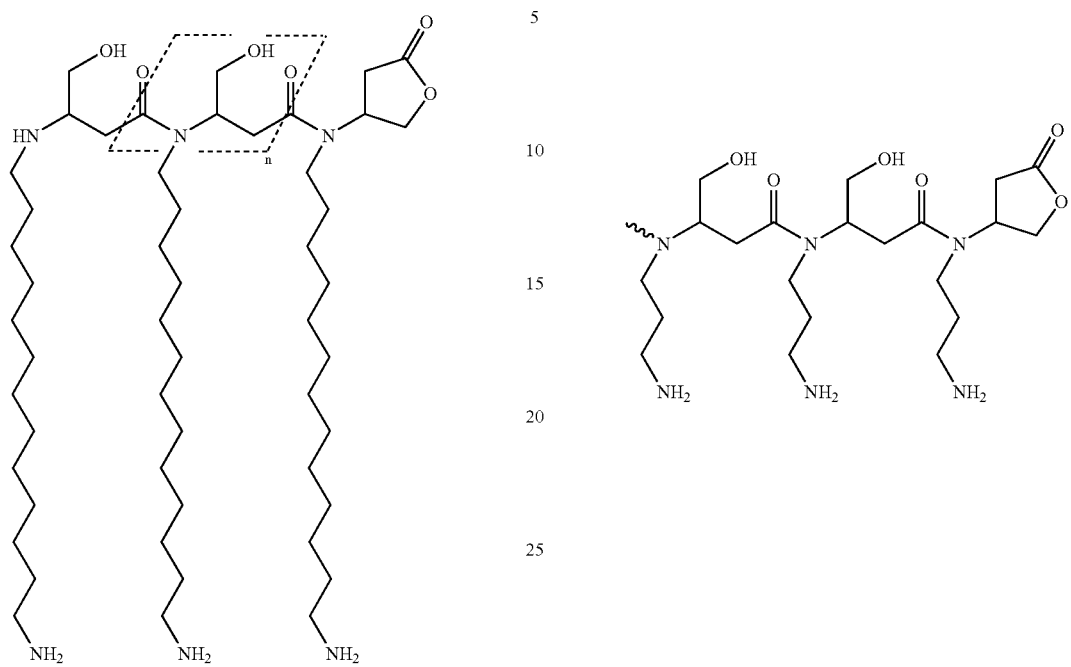
Scheme 3.
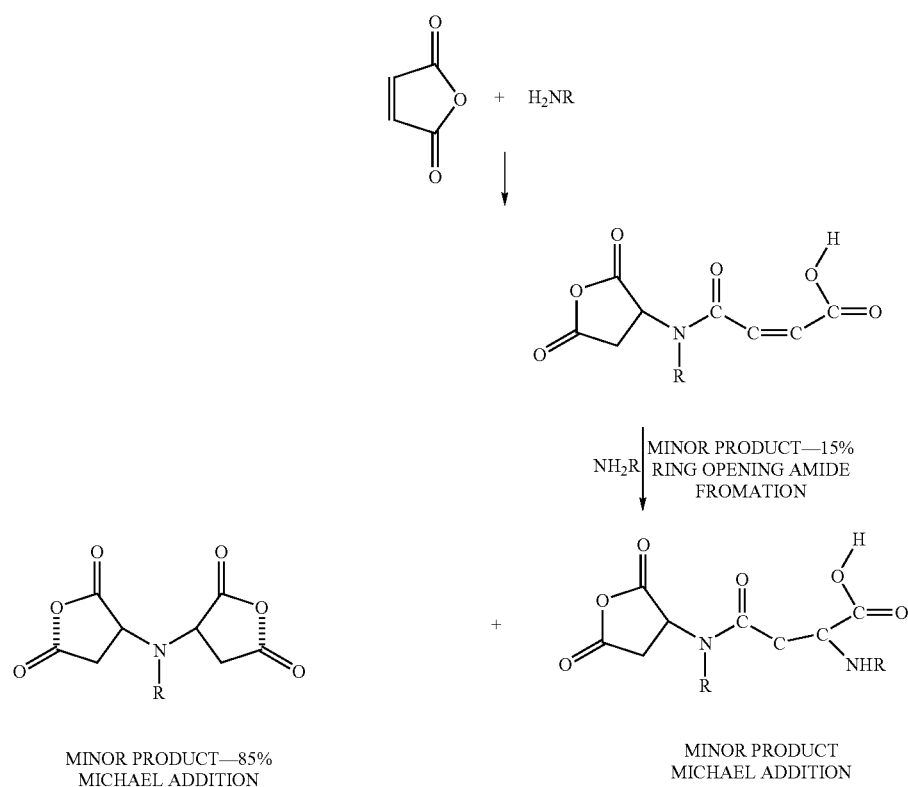

Scheme 4.

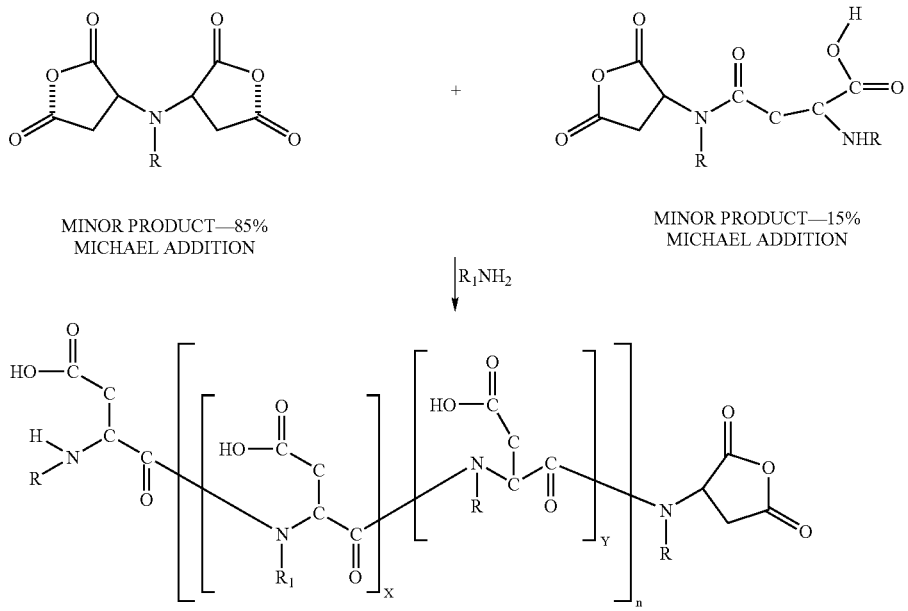

MINOR PRODUCT—85%
MICHAEL ADDITION

MINOR PRODUCT—15%
MICHAEL ADDITION

What is claimed is:

1. A conductive composition comprising:
(A) a crosslinked polymeric material formed by a process comprising reacting a polymer and a crosslinking agent, wherein the polymer has side chains along a backbone forming the polymer, at least two of the side chains being substituted with one or more heteroatoms selected from the group consisting of oxygen, nitrogen, sulfur, phosphorus and combinations thereof, the polymer formed by reacting a mixture comprising
  (i) one or more monomers selected from the group consisting of unsaturated dicarboxylic acids, esters of unsaturated dicarboxylic acids, anhydrides of unsaturated dicarboxylic acids, and mixtures thereof; and
  (ii) one or more amines selected from the group consisting of R—$NH_2$, a polyalkylene polyamine, and mixtures thereof, wherein the R group contains between 1 and 50 carbon atoms and one or more of the selected amines includes at least two amino groups; and
(B) a plurality of copper species distributed within the crosslinked polymeric material,
  wherein the conductive composition has a resistance of no more than about 100 ohms.

2. The conductive composition of claim 1, the one or more monomers selected from the group consisting of maleic anhydride, maleic acid esters, and mixtures thereof.

3. The conductive composition of claim 2, wherein the one or more monomers include maleic acid monoester, maleic acid diester, or mixtures thereof.

4. The conductive composition of claim 1, the one or more amines including R—$N_2$, wherein the R group contains between 8 and 20 carbon atoms.

5. The conductive composition of claim 1, the one or more amines including polyalkylene polyamine.

6. The conductive composition of claim 5, wherein the polyalkylene polyamine comprises polyethyleneimine, pentaethylenehexamine, tetraethylenepentamine, or a mixture thereof.

7. The conductive composition of claim 1, the one or more amines including at least one R—$NH_2$ and at least one polyalkylene polyamine.

8. The conductive composition of claim 1, wherein the crosslinking agent comprises at least two functional groups capable of reacting with an amino group.

9. The conductive composition of claim 8, wherein the one or more crosslinking agents are selected from the group consisting of aliphatic isocyanate compounds having 2 or more —N═C═O groups; aromatic isocyanate compounds having 2 or more —N═C═O groups; aliphatic aldehyde compounds having 2 or more —CHO groups; aromatic aldehyde compounds having 2 or more —CHO groups; phosphines having the general formula $(A)_2P(B)$ wherein A is hydroxyalkyl, and B is hydroxyalkyl, alkyl, or aryl; epoxy resins having end groups of the formula:

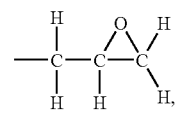

and mixtures thereof.

10. A conducting nanocomposite comprising the conductive composition of claim 1.

11. An OLED or LED device comprising a transparent conductive layer which comprises the conductive composition of claim 1.

12. An article comprising a conductive coating on a surface of a substrate wherein the conductive coating comprises the conductive composition of claim 1.

13. The article of claim 12, wherein the surface is an amino-functional modified surface.

14. The conductive composition of claim 1, wherein the conductive composition has a resistance of about 10–100 ohms.

15. A conductive material comprising:
(A) a polymeric material comprising a polymer having side chains along a backbone forming the polymer, at least two of the side chains being substituted with one or more heteroatoms selected from the group consisting of oxygen, nitrogen, sulfur, phosphorus and combinations thereof, wherein the polymer is synthesized by a process that includes reacting a mixture comprising:
  (i) one or more monomers selected from the group consisting of unsaturated dicarboxylic acids, esters of unsaturated dicarboxylic acids, anhydrides of unsaturated dicarboxylic acids, and mixtures thereof; and
  (ii) one or more amines selected from the group consisting of R—$NH_2$, polyalkylene polyamines, and mixtures thereof, wherein the R group contains between 1 and 50 carbon atoms and one or more of the selected amines includes at least two amino groups; and
(B) one or more copper species distributed within the polymeric material,
  wherein the conductive material has a resistance of no more than about 100 ohms.

16. The conductive material of claim 15, the one or more monomers selected from the group consisting of maleic anhydride, maleic acid esters, and mixtures thereof.

17. The conductive material of claim 16, wherein the one or more monomers include maleic acid monoester, maleic acid diester, or mixtures thereof.

18. The conductive material of claim 15, the one or more amines including R—$NH_2$, wherein the R group contains between 8 and 20 carbon atoms.

19. The conductive material of claim 15, the one or more amines including polyalkylene polyamine.

20. The conductive material of claim 19, wherein the polyalkylene polyamine comprises polyethyleneimine, pentaethylenehexamine, tetraethylenepentamine, or a mixture thereof.

21. The conductive material of claim 15, the one or more amines including at least one R—$NH_2$ and at least one polyalkylene polyamine.

22. The conductive material of claim 15, wherein the polymer is crosslinked by a process that includes reacting the polymer with one or more crosslinking agents comprising at least two functional groups capable of reacting with an amino group.

23. The conductive material of claim 22, wherein the one or more crosslinking agents are selected from the group consisting of aliphatic isocyanate compounds having 2 or more —N=C=O groups; aromatic isocyanate compounds having 2 or more —N=C=O groups; aliphatic aldehyde compounds having 2 or more —CHO groups; aromatic aldehyde compounds having 2 or more —CHO groups; phosphines having the general formula $(A)_2P(B)$ wherein A is hydroxyalkyl, and B is hydroxyalkyl, alkyl, or aryl; epoxy resins having end groups of the formula:

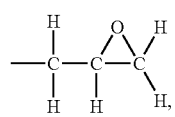

and mixtures thereof.

24. A conducting nanocomposite comprising the conductive material of claim 15.

25. An OLED or LED device comprising a transparent conductive layer which comprises the conductive material of claim 15.

26. An article comprising a conductive coating on a surface of a substrate wherein the conductive coating comprises the conductive material of claim 15.

27. The article of claim 26, wherein the surface is an amino-functional modified surface.

28. The conductive material of claim 15, wherein the conductive material has a resistance of about 10–100 ohms.

29. A conductive composition comprising:
(A) a crosslinked polymeric material formed by a process comprising reacting a polymer and a crosslinking agent, wherein the polymer has side chains along a backbone forming the polymer, at least two of the side chains being substituted with one or more heteroatoms selected from the group consisting of oxygen, nitrogen, sulfur, phosphorus and combinations thereof, the polymer formed by reacting a mixture comprising
  (i) one or more monomers selected from the group consisting of unsaturated dicarboxylic acids, esters of unsaturated dicarboxylic acids, anhydrides of unsaturated dicarboxylic acids, and mixtures thereof; and
  (ii) one or more amines selected from the group consisting of R—$NH_2$, a polyalkylene polyamine, and mixtures thereof, wherein the R group contains between 1 and 50 carbon atoms and one or more of the selected amines includes at least two amino groups; and (B) a plurality of silver species distributed within the crosslinked polymeric material,
  wherein the conductive composition has a resistance of no more than about 100 ohms.

30. The conductive composition of claim 29, wherein the conductive composition has a resistance of about 10–100 ohms.

31. A conductive material comprising:
(A) a polymeric material comprising a polymer having side chains along a backbone forming the polymer, at least two of the side chains being substituted with one or more heteroatoms selected from the group consisting of oxygen, nitrogen, sulfur, phosphorus and combinations thereof, wherein the polymer is synthesized by a process that includes reacting a mixture comprising:
  (i) one or more monomers selected from the group consisting of unsaturated dicarboxylic acids, esters of unsaturated dicarboxylic acids, anhydrides of unsaturated dicarboxylic acids, and mixtures thereof; and
  (ii) one or more amines selected from the group consisting of R—$NH_2$, polyalkylene polyamines, and mixtures thereof, wherein the R group contains between 1 and 50 carbon atoms and one or more of the selected amines includes at least two amino groups; and
(B) one or more silver species distributed within the polymeric material,
  wherein the conductive material has a resistance of no more than about 100 ohms.

32. The conductive material of claim 31, wherein the conductive material has a resistance of about 10–100 ohms.

33. A conductive material formed from a coating composition comprising:
(A) a polymer-based material which includes a polyamide having two or more amino functionalized side chains; and
(B) copper species or silver species distributed within the polyamide;
   the polymer-based material is formed by a process which comprises adding an organic soluble metal salt of copper or silver to a solution of the polyamide in an organic solvent; and
   the polyamide is formed by reacting a mixture comprising:
   (i) one or more monomers selected from the group consisting of unsaturated dicarboxylic acids, esters of unsaturateddicarboxylic acids, anhydrides of unsaturated dicarboxylic acids, and mixtures thereof; and
   (ii) one or more amines selected from the group consisting of R—$NH_2$, polyalkylene polyamines, and mixtures thereof, wherein the R group contains between 1 and 50 carbon atoms and one or more of the selected amines includes at least two amino groups;
wherein the copper species or silver species is present at a sufficient concentration in the coating composition such that the resistance of the conductive material is no more than about 100 ohms.

34. The conductive material of claim 33, wherein the conductive material has a resistance of about 10–100 ohms.

* * * * *